May 5, 1970     V. T. STACK, JR     3,510,407

METHOD OF DETERMINING CONSUMED OXYGEN

Filed Jan. 22, 1965     5 Sheets-Sheet 1

INVENTOR
VERNON T. STACK, JR.

BY
Robert S. Dunham
ATTORNEY

United States Patent Office 3,510,407
Patented May 5, 1970

3,510,407
METHOD OF DETERMINING CONSUMED OXYGEN
Vernon T. Stack, Jr., Chadds Ford, Pa., assignor to Pennwalt Corporation, a corporation of Pennsylvania
Continuation-in-part of application Ser. No. 411,755, Nov. 17, 1964. This application Jan. 22, 1965, Ser. No. 427,296
Int. Cl. B01d 59/40
U.S. Cl. 204—1                    19 Claims

ABSTRACT OF THE DISCLOSURE

A determination of oxygen consumed in the stabilization of organic material is made by establishing a mixture of a culture of microorganisms and organic material in which the organic material may be rapidly stabilized within a few hours time, for example, providing the mixture with a sufficient supply of oxygen to ensure the rapid stabilization of the organic material and detecting the rate of oxygen consumption in the mixture. The rate may be detected at a number of times during the rapid stabilization to provide for integration of the rate leading to an indication of total oxygen consumed in stabilization.

---

This application is a continuation-in-part of my copending application Ser. No. 411,755 filed Nov. 17, 1964 for Measuring System.

This invention relates to the measurement of oxygen consumption and, more particularly, to the measurement of the consumption of oxygen in a biological oxidation system.

Oxygen is consumed in a biological oxidation system, as in an aerobic culture of microorganisms, through the action of the microorganisms as organic material is oxidized into synthesized cell material and other oxidation products and as synthesized cell material is oxidized further. The amount of oxygen consumed by such a system is of importance in sanitary engineering applications concerned, for example, with waste streams, both before and after treatment, effluents from treatment processes, and the quality of natural waters. It is common to express the consumption of oxygen in a biological oxidation system in terms of the biochemical oxygen demand (BOD), which is the amount of oxygen consumed by the system in a predetermined interval, typically a period of five days. The measurement, however, may require a period as long as twenty days to determine the ultimate amount of oxygen consumed by the system.

It is important to be able to make a fundamental measurement of oxidation in a biological oxidation system in a much shorter period of time, such as a fraction of an hour. For example, in the treatment of sewage, it is desirable to be able to continuously monitor the oxidation processes in order to determine the degree of completion and progress of oxidation reactions.

It has been found that a fundamental measurement in any biological oxidation system is that amount of oxygen required to synthesize organic material in the system to cell material and other oxidation products. This amount of oxygen, termed energy oxygen herein, is distinct from the oxygen consumed by the system in auto-oxidation, which is the oxidation of synthesized cell material. It is believed that the energy oxygen per unit quantity of a particular organic material is constant regardless of the nature of the biological oxidation process. Hence, for a particular material, energy oxygen is the same whether the material is being oxidized slowly or rapidly. Thus a technique for measuring energy oxygen, wherein the oxidation process is accelerated, provides a basis for making a fundamental measurement of the process in a relatively short time.

Accordingly, an object of the present invention is to provide for the measurement of the consumption of oxygen in a biological oxidation system.

A further object of the present invention is to provide for the measurement of energy oxygen in a biological oxidation system.

It is a still further object of the present invention to provide for the measurement of energy oxygen in a biological oxidation system capable of being carried out in a relatively short time.

It is another object of the present invention to provide a technique for making a fundamental measurement which lends itself to continual monitoring of a biological oxidation process.

Yet another object of the present invention is to provide for the measurement of oxygen consumed in a biological oxidation system in undergoing free energy transfers in reactions which synthesize organic material into cell material and biologically-stable oxidation products.

These and other objects are achieved in the present invention by providing a sample of a feed material to be analyzed, adding it to a culture of microorganisms in which oxidation can occur at a fast rate, and detecting and integrating the rate of oxygen consumption during the time that organic matter in the feed material is synthesized into cell material and other oxidation products. In particular, a stabilized culture of microorganisms is maintained in which only auto-oxidation reactions are taking place. That is, no unstable organic material other than microorganisms is present in the culture which is being oxidized. The rate of oxygen consumption, i.e., the auto-oxidation rate, of the culture is determined. Next, feed material to be tested, at least a part of which is constituted of organic matter, is added to the culture, and the mixture of the culture and feed material is aerated so that a sufficient amount of oxygen is continuously present to satisfy all oxygen demands. A part of organic material in the feed material undergoes oxidation in the culture as the remainder is synthesized into cell material and other oxidation products. In this regard the concentration of microorganisms in the mixture is maintained high enough, by proper selection of the culture, to ensure that oxidation and synthesis of the organic matter into cell material and other oxidation products is accomplished in a relatively short period of time, say one half an hour. During this time, the rate of oxygen consumption in the mixture initially increases sharply over the auto-oxidation rate of the initial culture, and then decreases to a relatively low steady state value representing auto-oxidation in the new culture. At this point, then, all of the organic matter has been oxidized or synthesized, and the system is stabilized. By detecting and then integrating the rate of oxygen consumption over the period between the departure of the rate from the auto-oxidation level of the initial culture to its return to the auto-oxidation level of the final culture, and then subtracting the amount of oxygen consumed in auto-oxidation reactions, a determination may be made of the energy oxygen of the feed material, i.e., of the total amount of oxygen consumed by the biological culture in reactions which provide energy for synthesis of the organic matter to cell material or stable oxidation products. This amount of oxygen, taken by itself or related to the BOD of the system monitored, provides useful information regarding the feed material. If the feed material is taken from a biological oxidation system in which oxidation has been progressing, the determination of the amount of oxygen required to synthesize whatever organic matter is present provides useful information regarding the state of the system and its degree of stabilization. Hence the steps just described may be repeated as often as desired to provide a continual monitoring of a biological oxidation system to determine the progress of the oxidation reactions.

The invention, although described above, will be more completely understood by reference to the following detailed description, which is to be read in conjunction with the appended drawings, in which.

Figure 1:
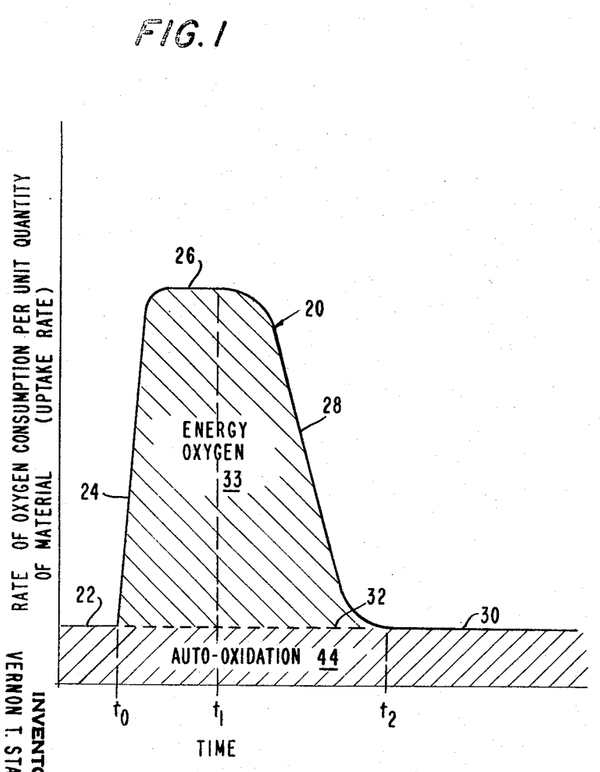
FIG. 1 is a characteristic curve showing the rate of oxygen consumption versus time for a typical aerobic biological oxidation system.

Referring to FIG. 1, a curve 20 is shown graphically presenting the rate of oxygen consumption, also referred to as the uptake rate, versus time for a typical aerobic biological oxidation system. The curve presents the uptake rate per unit quantity of material in the system, and hence is normalized. Curve segment 22 represents the rate of auto-oxidation, i.e., the uptake rate when no organic material is present in the system. The following equation represents the reactions that take place during auto-oxidation:

(1)

It will be noted that synthesized cell material in the presence of microorganisms and oxygen, as well as nutrients and enzymes, leads to the production of further synthesized cell material plus oxidation products. The reaction represented by Equation 1 is a closed cycle reaction, and theoretically continues in a closed system until there are no viable microorganisms present.

At time $t_0$ organic material is introduced into the system. Soon after the introduction of the organic material, accelerated consumption of oxygen takes place, as represented by the almost vertical curve segment 24 which levels off into curve segment 26. At time $t_1$ the oxygen uptake rate commences to decrease, as represented by curve segment 28, until time $t_2$ when the curve levels off into segment 30.

Between the times $t_0$ and $t_2$, not only is auto-oxidation taking place, as represented by Equation 1, but other oxidation reactions are also occurring, as represented by the following equation:

(2)

Equation 2 represents the synthesis of organic material into cell material and other oxidation products. At time $t_2$ in FIG. 1, the synthesis of organic material is complete, and hence none of the organic material originally fed remains, so that only auto-oxidation, represented by Equation 1, takes place. At time $t_2$ the system is said to be stabilized.

The period between times $t_0$ and $t_2$ may be relatively short in the event that the concentration of micro-organisms is sufficiently high in the stabilized culture to which the sample of organic material is added. With a proper concentration, this time perod can be as short as a quarter of an hour. It should be noted that in any system as represented in FIG. 1, a sufficient supply of oxygen should be maintained at all times to satisfy the needs of auto oxidation as well as synthesis.

Figure 2:
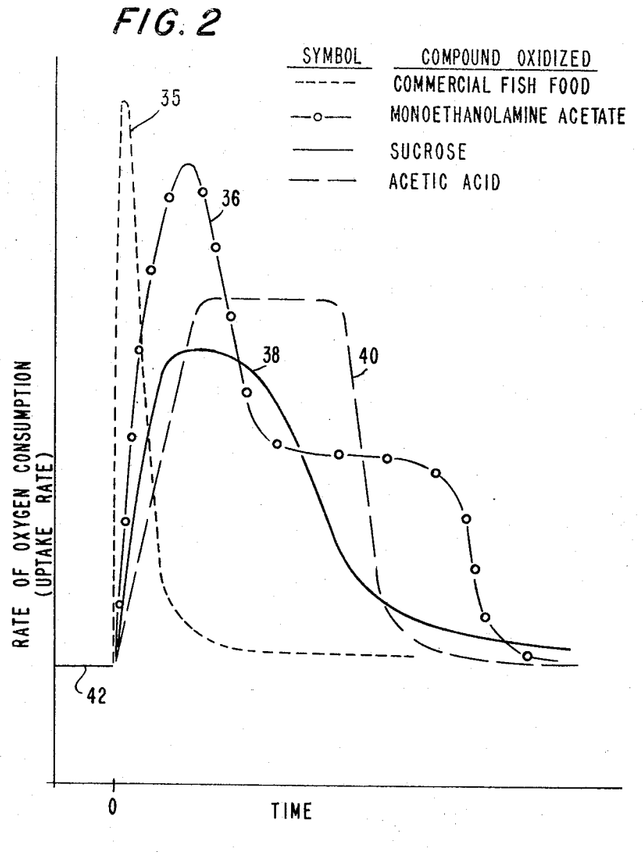
FIG. 2 shows a plurality of curves similar to the curve of FIG. 1, showing the rate of oxygen consumption versus time for samples of different organic materials in corresponding cultures of microorganisms.

FIG. 2 shows representative curves similar to the curve 20 of FIG. 1 for different feeds of organic material each added to an appropriate stabilized culture. The curves of FIG. 2 present the uptake rates versus time for each of entire systems, and do not plot a normalized uptake rate as in FIG. 1. Curve 35 represents the addition of commercial fish food into an appropriate culture, curve 36 represents the addition of monoethanolamine acetate into an appropriate culture, curve 38 represents the addition of sucrose into an appropriate culture, and curve 40 represents the addition of acetic acid into an appropriate culture. The curves are all of different shapes, which illustrates how different organic materials consume oxygen in differing rates and in differing quantities to become stabilized. It will be noted that the level of auto-oxidation of each culture prior to the addition of the feed of organic material, as represented by curve segment 42, is not the same as the final level assumed for each of the curves 35, 36, 38 and 40. Specifically, each of these latter curves levels off at a level somewhat higher than the level 42. This is because the curve 42 represents auto-oxidation for the initial culture. Following the synthesis of the organic material to cell material and other oxidation products, a different biological system is present in which the rate of auto-oxidation is necessarily higher because of the presence of additional cell material. The segments 22 and 30 of the curve 20 of FIG. 1 are at the same uptake rate level, in distinction, since the curve 20 is normalized.

In FIG. 1, the area of the curve 20 bounded by curve segments 24, 26 and 28 and dashed line 32, designated as area 33, is representative of the amount of oxygen consumed in energy reactions where part of the organic material is oxidized. The energy produced is used to synthesize the remaining organic material into cell material. The area under the dashed line 32 between the times $t_0$ and $t_2$, designated as area 44, is representative of the amount of oxygen consumed in auto-oxidation. The area 33 is referred to as energy oxygen, and is a fundamental measurement related to the free energy transfers that take place in a system in synthesizing the organic material therein into cell material and other oxidation products. The energy oxygen of a particular organic material is believed to be a constant, and hence a measurement of the amount of oxygen consumed in synthesizing organic matter remaining after other organic matter has been synthesized provides an indication of the state of oxidation of that material, and hence is a useful measurement in sanitary engineering applications.

To detect the energy oxygen of any material, or to detect the amount of oxygen needed to stabilize the material, the present invention provides for the determination of the oxygen uptake rate of the material when added to a compatible culture of microorganisms in which synthesis of the organic matter therein to cell material and other oxidation products can take place in a relatively short time. The oxygen uptake rate is detected, for example, by the technique and apparatus disclosed in my copending application referred to above. The detected rate is then integrated during the time that synthesis of the organic matter is taking place to provide a measure of the total amount of oxygen consumed for synthesis and auto-oxidation. The amount of oxygen consumed by the auto-oxidation process during this time is next subtracted to provide an indication of the oxygen consumed for synthesis.

Typically, a predetermined volume of culture is provided with a concentration of microorganisms in the range of 2,000–5,000 milligrams per liter. This concentration of microorganisms is sufficient so that the synthesis reactions are completed relatively quickly and so that a significant increase in the oxygen uptake rate over the auto-oxidation rate is achieved when feed material containing organic matter is supplied to the culture. The culture of microorganisms should be compatible with the organic matter, and typically is a stabilized culture which has been grown on the feed material itself. In this regard, the culture of microorganisms must be stabilized before the feed material is supplied to the culture; that is, the culture must be consuming oxygen only for auto-oxidation and must not be in the process of stabilizing previously fed organic matter. The operating temperature should typically be between 20° C. and 35° C., and should be relatively constant during a given test to ensure a stable rate of oxygen uptake by auto-oxidation. Oxygen should be present in sufficient quantity to supply all oxygen demands.

The rate of oxygen consumption in the stabilized culture of microorganisms is detected and noted. Following this, a predetermined amount of feed material to be tested, containing organic matter, is supplied to the stabilized and compatible culture of microorganisms. The oxygen uptake rate is then detected, either continuously or periodically, until the feed material has become stabilized and all the organic matter has been synthesized to cell material and other oxidation products. A curve similar to the curve 20 in FIG. 1 is developed from the detected oxygen uptake rate, and the area under the curve above the base line representative of auto-oxidation is then computed (area 33 in FIG. 1). This then provides an indication of the amount of oxygen consumed to stabilize organic material present in the feed material. The test just described may thus be employed to monitor concentrations of organic material present in water such as natural streams. In particular, a small sample of material may be removed from the stream and tested as above to determine energy oxygen. Such a test is performed periodically to determine changes in energy oxygen which are directly related to changes in the amount of organic material. Inasmuch as each test may be performed in a relatively short time, say one half an hour, continual variation in concentrations of organic material can be detected.

The following Examples 1 through 8 give the results of tests that were carried out in accordance with the invention to determine energy oxygen of different feed materials. In each test, a culture of microorganisms was employed which was grown from the feed material that was later added to the culture to determine the energy oxygen of the feed material. In all tests, except certain tests in Example 7, the culture was stabilized prior to the addition of the feed material thereto. In all tests the various operations were carried out at ambient temperatures.

In all tests of Examples 1 through 7, the oxygen uptake rate was determined through the use of a single dissolved oxygen probe of the type shown in Pat. No. 2,913,386 issued on Nov. 17, 1959 to L. C. Clark, Jr. Such a probe is typically a polarographic cell which yields electrical signals representative of the concentration of dissolved oxygen in liquid presented thereto. In each test, a small sample of the culture or mixture of culture and feed material under test, as the case might be, was removed at each of successive times during the test. Each sample was transferred to a closed system containing the dissolved oxygen probe. The concentration of dissolved oxygen in the closed system was then detected at a number of times during an interval of roughly one minute to determine the contemporaneous rate of oxygen consumption in the sample. The samples, taken successively over the course of an hour or two during a test, indicated the oxygen uptake rate at the time each sample was taken. This data was used to develop a curve similar to the curve 20 shown in FIG. 1 graphically illustrating the uptake rate versus time for a particular culture and mixture of culture and feed material. In the test of Example 8, the oxygen uptake rate was determined through the use of an uptake rate device as disclosed in my copending application referred to above.

EXAMPLE 1

Figure 3:
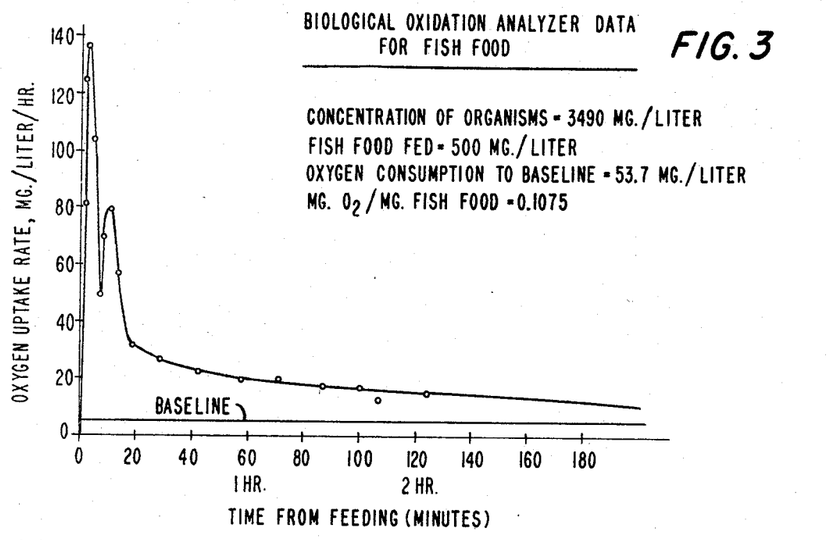
FIGS. 3 through 9 are curves similar to the curve of FIG. 1, plotting the rate of oxygen consumption versus time, as determined in tests conducted in accordance with the invention upon various organic materials.

In a test that was performed, fish food purchased from a pet shop was employed to create a stabilized fish food culture and to provide feed material containing organic matter for tests. The fish food was one of many available products typically containing proteins, carbohydrates, fats, nitrogen and phosphorus, among other things. In the stabilized culture that was prepared from the fish food, the concentration of microorganisms was roughly 3.490 milligrams of microorangisms per litter of culture. The fish food was then fed to the stabilized culture, in the concentration of 500 milligrams of fish food for every liter of culture. The oxygen uptake rate of the mixture of feed material and culture was determined as outlined above, and the results of the uptake rate determination are shown in FIG. 3. It will be noted from this figure that the uptake rate increased within a period of two minutes following the application of the feed to the culture from an auto-oxidation rate of roughly 5 milligrams of oxygen per liter of culture per hour to 137 milligrams of oxygen per liter of mixture of feed material and culture per hour. The uptake rate then sharply decreased in the next six minutes to roughly 49 mg./liter/hr., at which time the decrease reversed and increased again to peak at an uptake rate of roughly 80 mg./liter/hr. at a time roughly nine minutes following the initial feeding of the fish food to the culture. The oxygen uptake rate then decreased first rapidly and then much more slowly toward the base line representing auto-oxidation. The total oxygen consumption to stabilize the mixture of culture and feed material, i.e., the area under the curve of FIG. 3 to the base line, was computed to be roughly 53.7 milligrams of oxygen per liter of mixture of feed material and culture. For the concentration of feed material employed, this amount of oxygen corresponds to an energy oxygen of 0.1075 milligram of oxygen per milligram of fish food.

EXAMPLE 2

Figure 4:
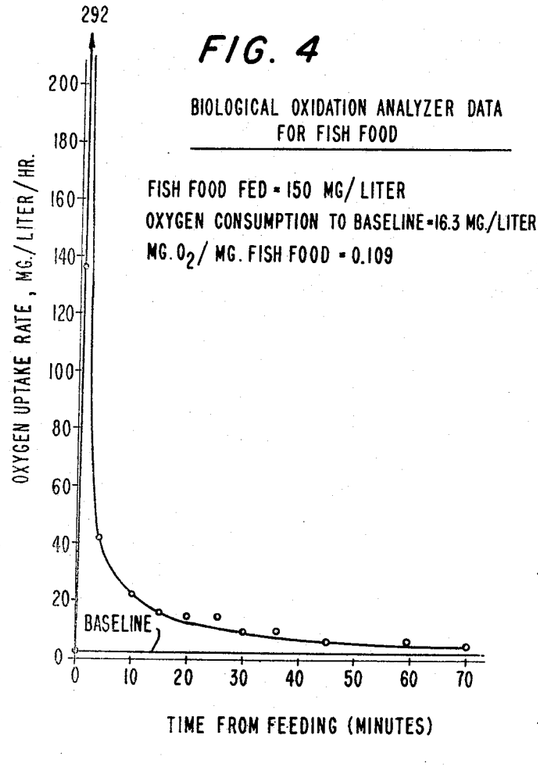

In this test, a stabilized fish food culture as in Example 1 was provided. The concentration of microorganisms in the culture was not determined but was most probably close to the concentration of 3,490 mg./liter in Example 1. In this case, however, the fish food feed material added to the stabilized culture was of a concentration of 150 mg./liter. FIG. 4 plots the data regarding the uptake rate of the mixture of culture and feed material for this test. The oxygen uptake rate increased in roughly three minutes from the initial application of the feed material to the culture from an auto-oxidation rate of approximately 3 milligrams of oxygen per liter of culture per hour to a rate of 242 milligrams of oxygen per liter of mixture of feed material and culture per hour. Following this the uptake rate decreased very rapidly to roughly 41 mg./liter/hr. eight minutes after the addition of the fish food to the culture. After this time, the uptake rate decreased relatively slowly and leveled off at a substantially constant uptake rate representative of auto-oxidation sometime after an hour. The area under the curve in FIG. 4 to the base line representing the total amount of oxygen consumed for stabilization was computed to be roughly 16.3 milligrams of oxygen per liter of mixture of feed material and culture, which corresponds to an energy oxygen of 0.109 milligram of oxygen per milligram of feed material. This value of energy oxygen deviates roughly 1.38% from the value computed in Example 1.

It will be noted upon a comparison of FIGS. 3 and 4 that the curves are not of similar shape but nonetheless define roughly the same area under the curve, which is expected since the energy oxygen should be the same. The reversals of the uptake rate in FIG. 3 at around six minutes and nine minutes following the application of the feed material to the culture represents an oxidation process peculiar to that particular mixture of culture and feed material.

EXAMPLE 3

Figure 5:
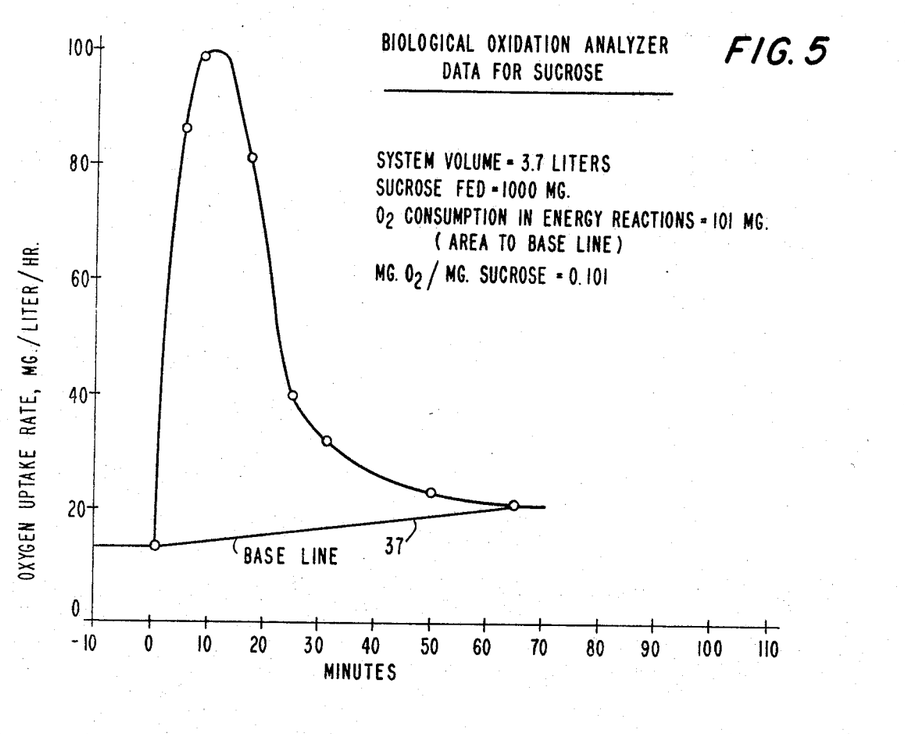

In this test, a stabilized culture grown on sucrose was prepared to which an organic feed material of sucrose was added. The sucrose was table sugar as purchased at a grocery store. In this case, the system volume was roughtly 3.7 liters of culture into which 1,000 milligrams of the sucrose feed material was applied. FIG. 5 shows a plot of the data regarding the uptake rate of the culture alone and then of the mixture of culture and feed material. From FIG. 5 it is apparent that the auto-oxidation rate of the culture alone was roughly 13 mg./liter/hr., while the oxygen uptake rate of the stabilized mixture was roughly 21 mg./liter/hr. In this particular test, the time for stabilization of the mixture was roughly one hour and five minutes. The uptake rate increased smoothly to a peak value of roughly 100 mg./liter/hr. at approximately ten minutes following the feeding of the sucrose feed material to the culture, after which time the uptake rate declined smoothly to the final auto-oxidation rate of 21 mg./liter/hr. In FIG. 5, a base line 37 provides a representation of the auto-oxidation rate of the mixture of culture and sucrose feed material during the time that stabilization of the mixture was taking place. The total oxygen consumed in energy reactions (area under the uptake rate curve to the base line) was computed to be roughly 101 milligrams of oxygen, corresponding to an energy oxygen of 0.101 milligram of oxygen per milligram of sucrose feed material.

EXAMPLE 4

Figure 6:
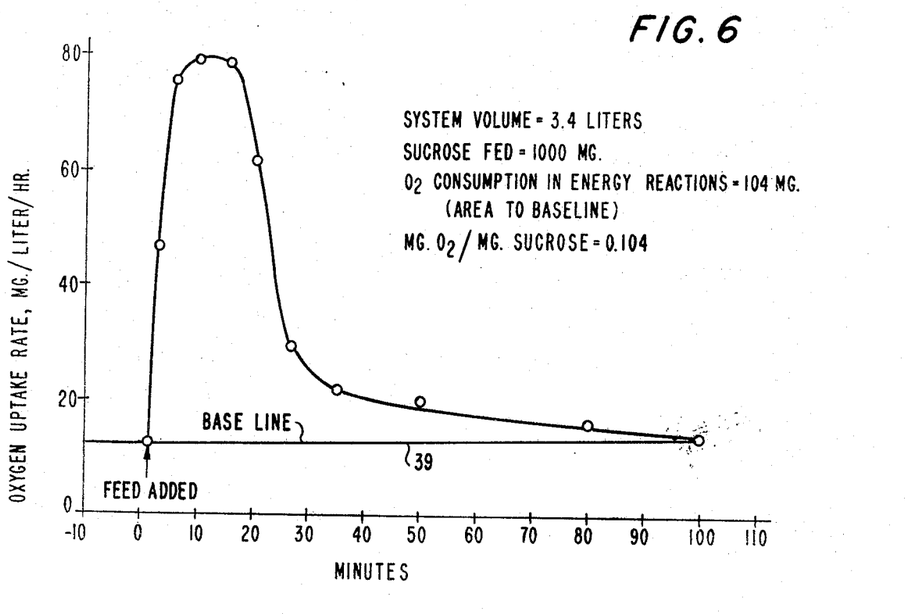

This test was the same as the test of Example 3, except that the system volume employed was 3.4 liters of culture. FIG. 6 plots the data regarding the oxygen uptake rate. It will be noted that the curve of FIG. 6 is of the same general shape as the curve of FIG. 5. In FIG. 6, a base line 39 corresponds to the base line 37 of FIG. 5. The total oxygen consumed in energy reactions (area under the uptake rate curve of FIG. 6 to the base line 39) was computed to be roughly 104 milligrams of oxygen, which corresponds to an energy oxygen of 0.104 milligram of oxygen per milligram of sucrose feed material. This value of energy oxygen differs from the energy oxygen value of Example 3 by roughly 3%.

EXAMPLE 5

Figure 7:
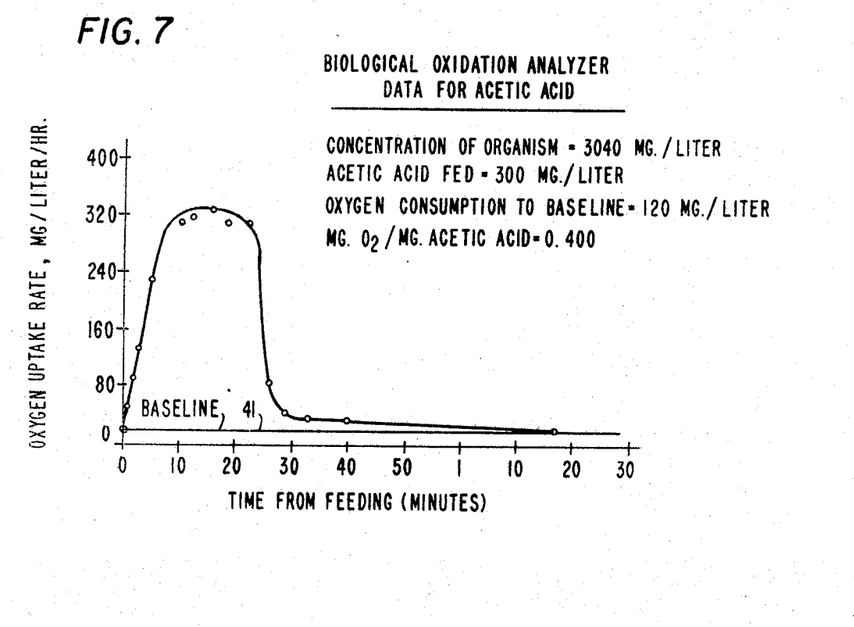

In this test, a stabilized culture grown on acetic acid was employed, to which an organic feed material of acetic acid was applied. The acetic acid was chemically pure acetic acid obtained from Fisher Scientific Company, Fairlawn, N.J. The concentration of microorganisms in the culture was roughly 3,040 mg./liter, and the concentration of acetic acid feed material was roughly 300 mg./liter. FIG. 7 shows the uptake rate as it was determined in this test. It is a bell-shaped curve similar to the curves for sucrose in FIGS. 5 and 6. A base line 41 provides a representation of the auto-oxidation rate of the mixture during stabilization. The area under the uptake rate curve to the base line 41 was computed to be roughly 120 milligrams of oxygen per liter of mixture of feed material and culture. This corresponds to an energy oxygen of 0.400 milligrams of oxygen per milligram of acetic acid feed material.

EXAMPLE 6

Figure 8:
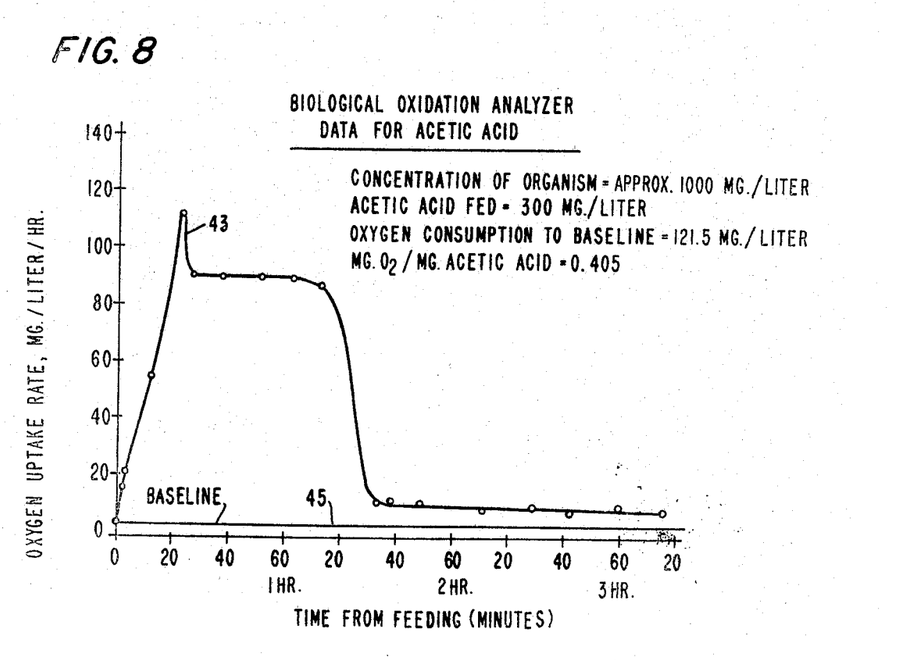

This test was the same as the test for Example 5, except that the concentration of microorganisms in the culture was roughly 1,000 mg./liter. FIG. 8 shows a plot of the data regarding the uptake rate of the mixture of culture and feed material. Unlike the curve of FIG. 7, the curve of FIG. 8 includes a sharp spike 43 which occurred roughly twenty-two minutes after the initial application of feed material to the culture. A base line 45 corresponds to the base line 41 in FIG. 7. The area under the uptake rate curve of FIG. 8 to the base line 45 is roughly 121.5 milligrams of oxygen per liter of mixture of feed material and culture, which corresponds to an energy oxygen of 0.405 milligram of oxygen per milligram of acetic acid feed material. Compared with the energy oxygen value of 0.400 computed from the test of Example 5, this value of energy oxygen represents a deviation of roughly 1.25%.

EXAMPLE 7

This example involved eight different tests that were performed to determine the energy oxygen of sucrose feed material in a stabilized culture of sucrose. The tests performed were similar to each of Examples 3 and 4 above and provided data giving the energy oxygen of the feed material as follows:

Table 1

| Sample No.: | Energy oxygen (mg.)/ Sucrose (mg.) |
|---|---|
| 1 | 0.104 |
| 2 | 0.101 |
| 3 | 0.117 |
| 4 | 0.100 |
| 5 | 0.105 |
| 6 | 0.103 |
| 7 | 0.117 |
| 8 | 0.114 |

In each of Samples 3, 7 and 8, the sucrose was fed to the culture before auto-oxidation had been reached. In other words, the culture was not stabilized. As a result, the energy oxygen determined for these samples was slightly higher than the energy oxygen determined for each of Samples 1, 2 and 4–6. This shows the importance of establishing a stabilized culture prior to the addition of organic feed material to be tested, for otherwise the culture itself includes organic material which contributes to the consumption of oxygen during stabilization and adds to the total amount of oxygen required for the system.

EXAMPLE 8

The test of this example was performed to determine the energy oxygen of acetic acid feed material applied to an acetic acid culture, and involved the use of an oxygen uptake rate device as disclosed in my copending application referred to above. The uptake rate device included inlet and outlet dissolved oxygen probes, each of which generated a signal representative of the concentration of dissolved oxygen in liquid presented thereto. Liquid was pumped from the inlet probe to the outlet probe in a predetermined transit time, and the signals from the probes were subtracted to generate a differential signal representative of the rate of oxygen consumption of the pumped liquid.

Figure 9:
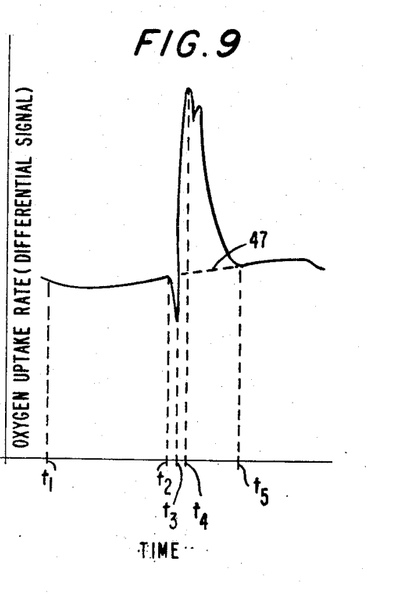

FIG. 9 is a curve plotting the differential signal versus time for the test. In the test, an acetic acid culture was employed in a system volume of approximately ten liters, into which the uptake rate device was immersed. The relatively constant value of the curve between times $t_1$ and $t_2$ represents the auto-oxidation rate of the culture. At time $t_2$, a feed of 200 mg. of acetic acid was added to the system. Between the times $t_2$ and $t_3$ the differential signal decreased sharply. This was because the addition of the feed material to the culture caused the oxygen uptake rate to increase sharply, so that the dissolved oxygen concentration of liquid in the inlet was substantially reduced. The liquid at the outlet of the device at this time, however, was the liquid passing through the device before the feed material was added to the culture. The oxygen uptake rate of this liquid was that represented by the portion of the curve between the times $t_1$ and $t_2$. Hence initially the differential output indication dropped simply because the liquid at the inlet was consuming oxygen much faster than the liquid at the outlet. Between the times $t_3$ and $t_4$, the culture with the new feed material became present at the outlet, until finally at the time $t_4$ the mixture filled the entire device and was passing therethrough. Between the times $t_4$ and $t_5$, the biological culture consumed oxygen at a decreasing rate as the feed material was oxidized. At time $t_5$ all the feed material was oxidized, and hence the differential signal assumed a substantially steady value representative of auto-oxidation in the stabilized culture. In the test that was conducted, roughly sixteen minutes elapsed between times $t_2$ and $t_5$. The differential signal between the initial auto-oxidation level between the times $t_1$ and $t_2$ and the peak uptake rate at time $t_4$ represented roughly 50 p.p.m. of dissolved oxygen per hour. The area under the curve to auto-oxidation base line 47 between times $t_4$ and $t_5$ was computed to be roughly 6.4 p.p.m. of oxygen. For the concentrations involved, this amount of oxygen corresponds to an energy oxygen value of 0.320 mg. of oxygen per mg. of acetic acid feed material.

In all of the examples above, energy oxygen was determined for a particular feed material. In many applications, it may be desirable to monitor a process which has been undergoing oxidation to determine the state of the process and the rate of stabilization of organic material. As pointed out above, tests may be periodically made involving samples taken from a large environment to be tested to determine energy oxygen as a measure of the amount of organic material in the environment. By comparing successive tests, continual data representing changes in concentration of organic material can be obtained. By virtue of the testing technique, which permits stabilization of the sample to be completed in a relatively short time, the environment may be frequently tested.

Figure 10:
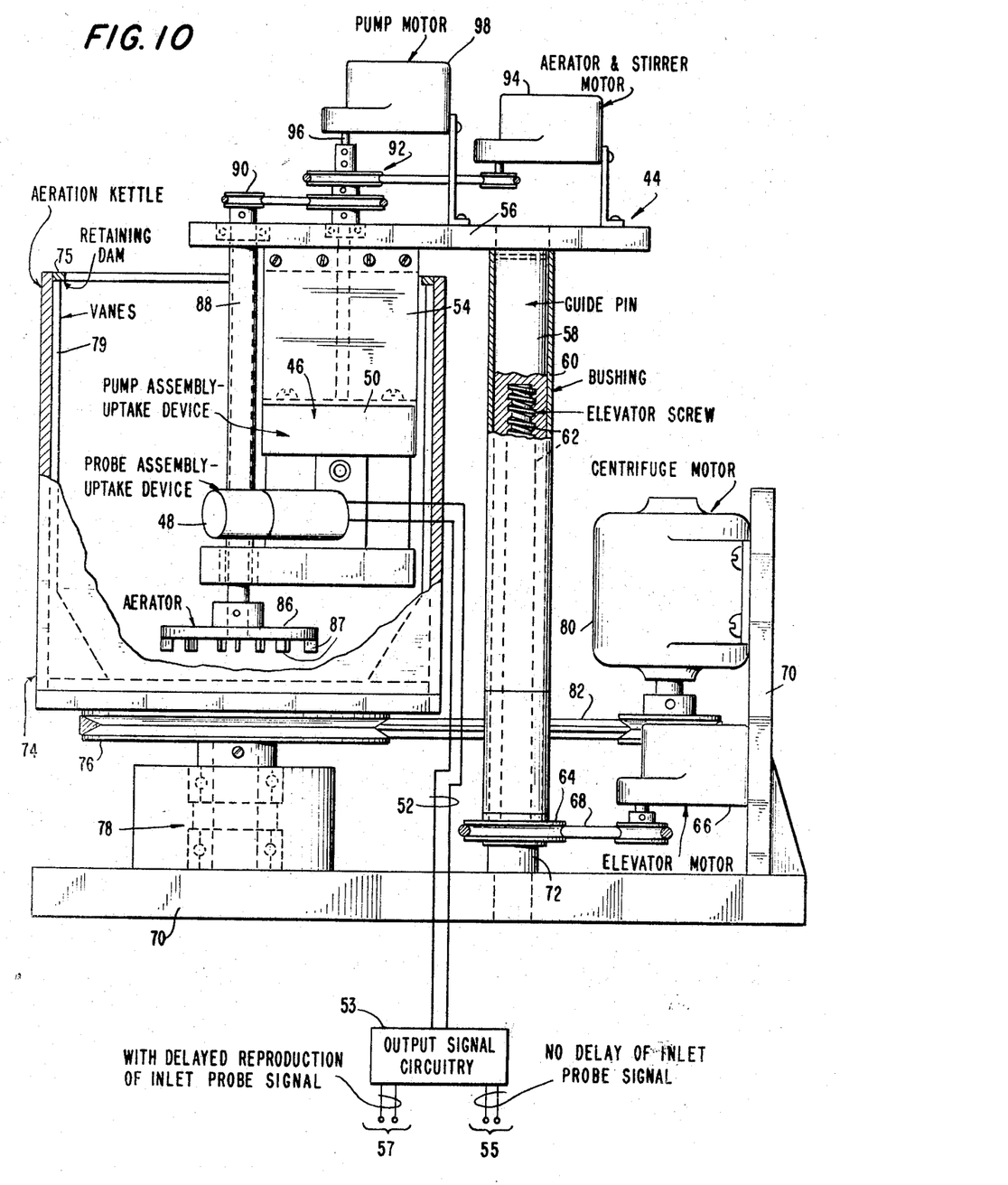
FIG. 10 is a front sectional view of apparatus suitable for continuously monitoring a biological oxidation system in accordance with the present invention.

FIG. 10 illustrates a representative system 44 which is particularly suited for monitoring energy oxygen. An oxygen uptake rate device 46 is shown which may be the same as the uptake rate device disclosed in my copending application referred to above. The uptake rate device includes a probe assembly designated generally in the drawing as 48 which includes an inlet probe and an outlet probe included within a housing, each of which determines the concentration of dissolved oxygen in liquid presented thereto. A pump assembly 50 pumps liquid from the inlet probe to the outlet probe in a predetermined transit time, and the signals from the probes may be utilized, as explained in my copending application, either directly or with delayed reproduction of the inlet probe signal, to provide a representation of the rate of oxygen consumption in liquid pumped through the device. Signals from the probes are developed on conductors 52 shown coupled to output signal circuitry 53, which is the same as the circuit shown in FIG. 13 of my copending application. Output signals are generated by the circuitry 53 at either terminals 55 (with no delay of the inlet probe signal) or 57 (with delayed reproduction of the inlet probe signal) and are representative of the oxygen uptake rate of liquid flowing through the device 46.

The uptake rate device 46 is mounted on a plate 54 secured to a support member 56, which is in turn attached to a guide pin 58 carried within a bushing or sleeve 60. The guide pin is threaded to receive elevator screw 62 which is coupled to a pulley 64 driven by an elevator motor 66 through a belt drive 68. The elevator motor is mounted on a frame 70 which also carries a support bearing 72 about which the pulley 64 is free to revolve. When the elevator motor 66 drives the pulley 64 to rotate the threaded elevator screw 62, the guide pin 58 is moved upwardly or downwardly within the sleeve 60, depending upon the direction of rotation of the elevator screw, to move the support member 56 and the uptake rate device 46 upwardly or downwardly as the case may be.

The uptake rate device 46 is enclosed within a kettle 74 open at the top. A lip or retaining dam 75 is included at the top of the kettle, and vertical vanes 79 are included along the sides. The bottom of the kettle is attached to a pulley 76 mounted for rotation on a support bearing 78 carried by the main frame 70. A centrifuge motor 80 drives the pulley 76 through a belt drive 82. When the pulley 76 is rotated, the entire kettle 74 is rotated so as to spill liquid within the kettle out of the top thereof. Depending upon the speed of rotation of the kettle and the lip 75 at the top of the kettle, a certain amount of liquid will be retained in the kettle. The vanes 79 serve to move the liquid in the kettle as the kettle is rotated to aid in the spilling action.

Also positioned within the kettle 74 is an aerator 86 having vanes 87 thereon and adapted to be rotated by a rod 88 attached thereto which is connected to a pulley 90. A pulley and belt drive system 92 couples the pulley 90 to an aerator and stirrer motor 94 carried by the support member 56. A shaft 96 passes through the pulleys of the drive system 92 and is driven by a pump motor 98 also carried by the support member. The other end of the shaft 96 is attached to the pump assembly 50 of the uptake rate device 46, and serves to drive the pump assembly to pump liquid through the uptake rate device.

To explain the operation of the entire testing system 44, it is assumed that a stabilized culture of microorganisms is within the kettle 74, and further that the support member 56 is in the position shown in the figure. The elevator motor 66 is energized for a sufficient period of time to raise the uptake rate device 46 and the aerator 86 carried by the support member 56 out of the kettle 74. Following this, the centrifuge motor 80 is energized to spin the kettle 74 at a certain speed to spill liquid within the kettle over the top thereof. The centrifuge motor is then de-energized, leaving a predetermined amount of stabilized culture undergoing only auto-oxidation within the kettle. Next, the elevator motor 66 is energized for a sufficient period of time to lower the uptake rate device 46 and the aerator 86 into the kettle. The pump motor 98 is then energized, along with the aerator and stirrer motor 94, and the oxygen uptake rate for auto-oxidation of the culture is determined as the culture is pumped through the uptake rate device 46. A measured amount of organic feed material to be tested is then introduced into the kettle 74, and continuous or successive readings are taken utilizing the uptake rate device 46 to develop data which when plotted assumes the form of a curve such as the curve 20 shown in FIG. 1. The pump motor 98 and the aerator and stirrer motor 94 remain energized for this entire time respectively so as to continuously pump liquid within the kettle through the uptake rate device 46 to determine the oxygen uptake rate and to provide sufficient oxygen to the mixture of culture and feed material to ensure that all oxygen requirements are satisfied. When it is determined that the mixture is stabilized, i.e., when the auto-oxidation uptake rate of the mixture is reached (level 30 in FIG. 1), the motors 94 and 98 may be de-energized, and enough data has been taken to complete the test. The system is then ready for a test of another feed material compatible with the culture in the kettle, or the culture remaining may be replaced by another, completely different culture.

From the description above, it is apparent that the invention provides for the measurement of oxygen needed to stabilize an organic material. It will be noted that the methods and apparatus specifically described are subject to variations and modifications capable of being made by those skilled in the art. Accordingly, the invention should be taken to be defined by the following claims.

What is claimed is:

1. In a method of determining oxygen consumed in the stabilization of organic material, the steps comprising establishing a fluid mixture of a predetermined amount of stabilized culture and a predetermined amount of organic material, the concentration of microorganisms in said mixture being substantially greater than the concentration of organic material in said mixture so as to permit the stabilization of said organic material at a relatively rapid rate, and, while applying an abundant supply of oxygen to the mixture at all times, measuring the rate of oxygen consumption in said mixture at successive times until said rate assumes a substantially steady value representaitve of auto-oxidation, at which time said organic material has become stabilized.

2. A method as recited in claim 1, wherein said concentration of microorganisms is in the range of from 2,000 to 5,000 parts per million.

3. A method as recited in claim 1, wherein said mixture of culture and organic material is maintained at a temperature within the range of from 20° to 35° C.

4. A method as recited in claim 1, including integrating said measured rate in order to determine the oxygen consumed in the stabilization of said organic material.

5. In a method of determining oxygen consumed in the stabilization of organic material, the steps comprising establishment from an organic material a stabilized culture of a predetermined amount, adding to said culture a predetermined amount of said organic material, the concentration of microorganisms in said mixture of culture and organic material being substantially greater than the concentration of organic material in said mixture so as to permit the stabilization of said organic material at a relatively rapid rate, and, while providing an abundant supply of oxygen to the mixture at all times, measuring the rate of oxygen consumption in said mixture at successive times until said rate assumes a substantially steady value representative of auto-oxidation, at which time said organic material has become stabilized.

6. A method as defined in claim 5, including integrating said measured rate in order to determine the oxygen consumed in the stabilization of said organic material.

7. In a method of determining oxygen consumed in the stabilization of organic material, the steps comprising establishing a fluid mixture of a predetermined amount of stabilized culture and a predetermined amount of organic material, the concentration of microorganisms in said mixture being substantially greater than the concentration of organic material in said mixture so as to permit the stabilization of said organic material at a relatively rapid rate, applying an abundant supply of oxygen to the mixture at all times, and removing a sample of said mixture at each of successive times and detecting the rate of oxygen consumption in said sample, until said detected rate assumes a substantially steady value for successive samples which is representative of auto-oxidation, at which time said organic material has become stabilized.

8. A method as defined in claim 7, including integrating the detected rate in order to determine the oxygen consumed in the stabilization of said organic material.

9. In a method of determining oxygen consumed in the stabilization of organic material, the steps comprising establishing a fluid mixture of a predetermined amount of stabilized culture and a predetermined amount of organic material, the concentration of microorganisms in said mixture being substantially greater than the concentration of organic material in said mixture so as to permit the stabilization of said organic material at a relatively rapid rate, applying an abundant supply of oxygen to the mixture at all times, removing at each of successive times a sample of said mixture and applying each sample in a closed volume to a probe which generates a signal representative of the concentration of dissolved oxygen in liquid presented thereto, and determining from said probe signal the rate of consumption of dissolved oxygen for each of said removed samples until the succession of said said determined rates assumes a substantially steady value for successive samples which is representative of auto-oxidation, at which time said organic material has become stabilized.

10. A method as defined in claim 9, including integrating the rate determined from said probe signal in order to determine the oxygen consumed in the stabilization of said organic material.

11. In a method of determining oxygen consumed in the stabilization of organic material, the steps comprising establishing a fluid mixture of a predetermined amount of stabilized culture and a predetermined amount of organic material, the concentration of microorganisms in said mixture being substantially greater than the concentration of organic material in said mixture so as to permit the stabilization of said organic material at a relatively rapid rate, applying an abundant supply of oxygen to the mixture at all times, immersing a housing within said mixture containing two probes each of which generates a signal representative of the concentration of dissolved oxygen in liquid presented thereto and both of which are connected by a closed path, and pumping liquid from said mixture from one of said probes to the other of said probes through said closed path in a predetermined transit time between said probes so as to develop signals representative of the rate of oxygen consumption in the pumped liquid, so as to detect the rate of oxygen consumption in said mixture until said rate assumes a substantially steady value representative of auto-oxidation, at which time said organic material has become stabilized.

12. A method as defined in claim 11, including detecting the rate of oxygen consumption in said mixture from said probe signals, and integrating said detected rate in order to determine the oxygen consumed in the stabilization of said organic material.

13. In a method of determining oxygen consumed in the stabilization of organic material in a biological oxidation system, the steps comprising establishing a mixture of organic material from said system and a culture of microorganisms, said mixture having a higher concentration of microorganisms in relation to the concentration of organic material than is present in the biological oxidation system so that stabilization of the organic material in the mixture is effected at a more rapid rate than the rate of stabilization of the system, providing the mixture with a sufficient supply of oxygen to ensure said rapid stabilization, and detecting at a time during said rapid stabilization the contemporaneous rate of oxygen consumption in said mixture.

14. A method as recited in claim 13, wherein the concentration of microorganisms in the mixture is in the range of from 2000 to 5000 parts per million.

15. A method as recited in claim 13, wherein the concentration of said microorganisms in weight per unit volume of mixture is substantially greater than the concentration of said organic material in weight per unit volume of mixture.

16. A method as recited in claim 13, wherein the concentration of microorganisms in the mixture is sufficient to result in substantial stabilization of the organic material in the mixture in no more than about three hours.

17. A method as recited in claim 13, wherein the contemporaneous rate of oxygen consumption in the mixture is determined at a plurality of times.

18. A method as defined in claim 17, including integrating the rate of oxygen consumption determined at said plurality of times in order to determine the oxygen consumed in the stabilization of said organic material.

19. A method as recited in claim 13, wherein the culture of microorganisms is one which has been grown from the organic material itself.

References Cited

UNITED STATES PATENTS

| | | | |
|---|---|---|---|
| 2,913,386 | 11/1959 | Clark | 204—195 |
| 3,045,665 | 7/1962 | Moyat | 204—129 |
| 3,336,161 | 8/1967 | Sutton et al. | 136—86 |

OTHER REFERENCES

"Journal of Bacteriology," vol. 21, January–June 1931, pp. 18 and 19.

Weston et al., "Jour. of the Water Pollution Control," vol. 27, 1955, pp. 802–819.

TA-HSUNG TUNG, Primary Examiner

U.S. Cl. X.R.

23—230, 232; 195—103.5; 204—195; 324—29